June 16, 1942.  S. H. MORTENSEN  2,286,871
LEAD CONNECTION FOR DYNAMO-ELECTRIC MACHINES
Filed Aug. 3, 1940
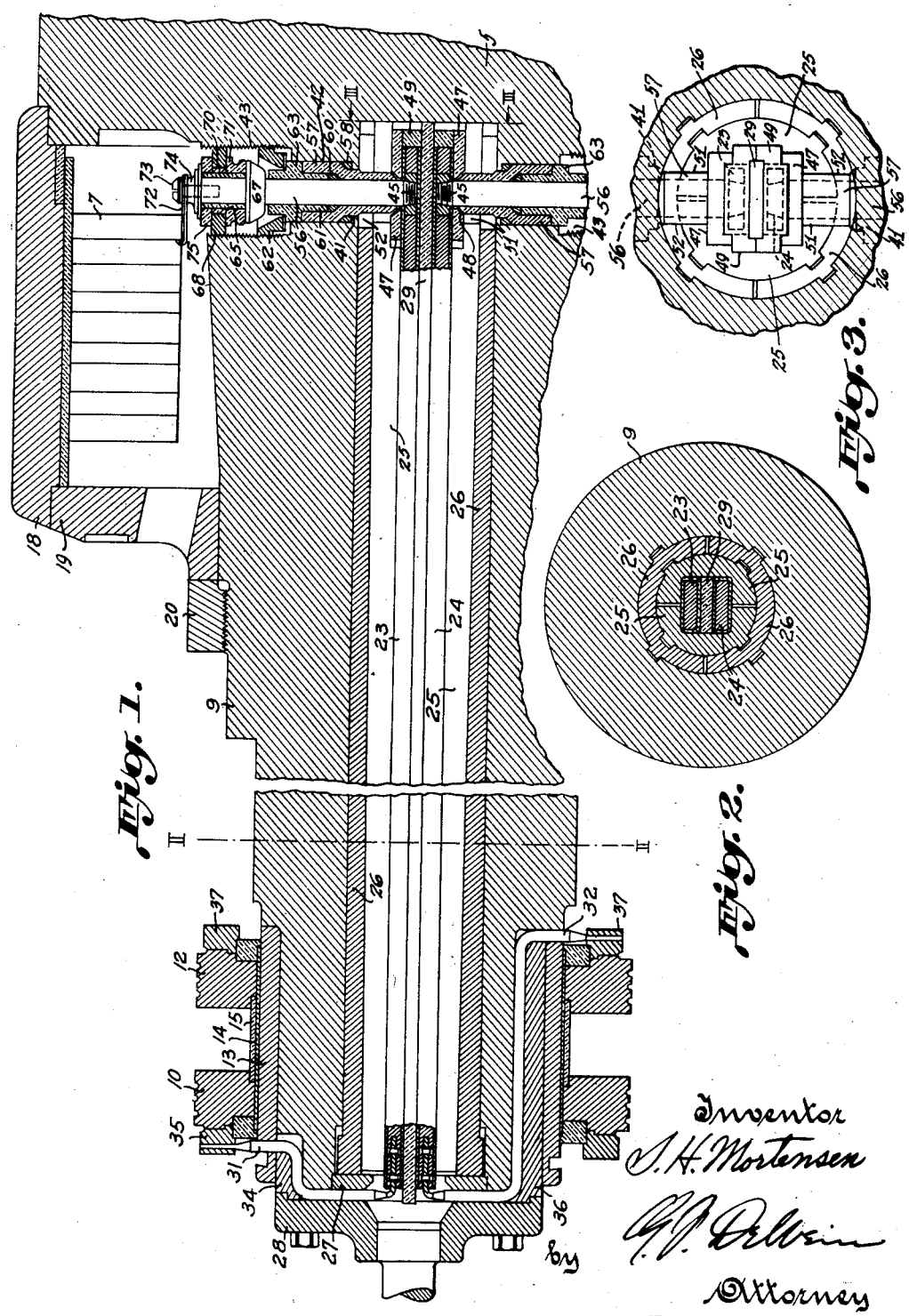

Patented June 16, 1942

2,286,871

UNITED STATES PATENT OFFICE 2,286,871

LEAD CONNECTION FOR DYNAMOELECTRIC MACHINES

Soren H. Mortensen, Wauwatosa, Wis., assignor to Allis-Chalmers Manufacturing Company, Milwaukee, Wis., a corporation of Delaware Application August 3, 1940, Serial No. 350,825

13 Claims. (Cl. 171—252)

This invention relates in general to dynamo-electric machines, and it has more particular relation to the connection of the windings of such machines to current-collecting devices thereof.

A suitable form of lead connection from current-collecting devices to windings of rotors of high speed dynamo-electric machines of considerable power, particularly machines of the turbo-generator type, involves several problems, in addition to the provision of a satisfactory electrical connection between the parts. These problems are incident to the provison of suitable insulation to withstand high voltages, the securing of the lead connections in position in a manner to minimize centrifugal stresses during operation of the machine, and in a manner such that all parts of the lead connection will safely withstand such stresses. And in machines of this class designed to operate in a hydrogen or like cooling medium, there is a further problem of insuring satisfactory sealing of the lead connection from the winding, where the lead connection is carried to a current-collecting device positioned outside of the enclosing gas-filled housing.

The present invention contemplates as features thereof the provision of an improved form of lead connection for dynamo-electric machines, where the lead connection is brought out from a winding on the rotor of the machine to a current-collecting device on the shaft at a point axially removed from the windings, and the location of the lead in a position to minimize centrifugal strains, the securing of the lead connection in a manner to thoroughly withstand any such strains, and the prevention of leakage of gas past the lead connections between the interior of the machine enclosure and the surrounding atmosphere.

It is an object of the present invention to provide an improved design and construction of lead connection from a winding on the rotor of a dynamo-electric machine to a current-collecting device associated therewith.

It is a further object of this invention to provide an improved design and construction of lead connection of this character so located and secured in position as to minimize and withstand centrifugal strains to which the lead connection may be subjected in the operation of the machine.

It is a further object of this invention to provide an improved design and construction of this character wherein a portion of the lead connection is centrally located and secured in an axial bore of the rotor shaft and connected to the rotor winding by connecting elements passing radially through the shaft and secured therein in a mechanically secure and gas-sealed and electrically insulated relation.

These and other objects and advantages of the invention, and the operation of a machine constructed in accordance therewith, will be apparent from the following description of a preferred embodiment of the invention shown in the drawing accompanying and forming part of this specification.

In the drawing:

Fig. 1 is a fragmental vertical sectional elevation of a dynamo-electric machine embodying the present invention;

Fig. 2 is a vertical sectional view in the plane of the line II—II of Fig. 1; and Fig. 3 is a vertical sectional view in the plane of the line III—III of Fig. 1.

In the drawing, the invention is shown as embodied in a dynamo-electric machine of the high speed turbo-generator type operated as a hydrogen-cooled machine. The rotor core 5 is in the form of a forged ingot machined to size and provided with conventional peripheral slots extending throughout the length of the core body, for the reception of the field winding, the projecting end turns of which are indicated at 7. The core body is preferably provided with integral shaft extensions 9 on the outer end of which shaft extensions current-collecting rings 10 and 12 are mounted through the intermediary of a sleeve 13 suitably secured in position on a reduced end of the shaft extension, with an intermediate insulating spacer 14, of mica or the like, between the collecting rings and the sleeve, and a spacing ring 15 of insulating material being held in position between the collector rings.

A bracing or holding ring 18, having a shouldered fit on the rotor core, holds the end turns 7 of the field winding in position in a conventional manner, and the ring 18 is held in position against axial displacement by a collar 19 forced against a shouldered abutment on the end of the ring 18, and is held in desired adjusted position by a ring 20 threaded on the shaft extension 9. The stator, not shown, of the machine is of conventional type, with the stator core mounted in position in a supporting and enclosing shell or housing whose end walls, through which the shaft projects, are arranged in gas-tight sealing relation with respect to the shaft whose bearings are located axially outside of the end of the housing and inside the collector rings.

The body portion of the lead connections are in the form of two insulated bar conductors 23, 24 disposed within a split sleeve 25 having a slightly conical exterior surface, this sleeve being disposed within a second split sleeve 26 having a slightly conical interior surface matching the outer surface of the sleeve 25. The normal relation of the two conical clamping and holding sleeves 25, 26 is preferably one where the splits between sections of one sleeve are staggered with respect to the splits in the other sleeve. While the sleeves are shown as being split in two sections, obviously, these sleeves may well be in three or more sections. As indicated, the outer surface of the outer conical sleeve 26 has a longitudinally splined guiding and positioning fit with the surface of the bore in the shaft extension 9, and the outer surface of the inner conical sleeve 25 has a longitudinally splined guiding and positioning fit with the inner surface of the outer conical ring 26. The sleeves 25 and 26 are secured in desired clamped relation within the bore of the shaft extension by a clamping or bearing ring 27 disposed in a recess in the end portion of the shaft extension and held in position against the end of the outer conical sleeve 26 by a clamping ring or plate 28 secured by bolts to an end portion of the shaft.

The bar conductors 23, 24 are held spaced from one another, within the inner conical sleeve 25, by a spacing strip 29 of insulating material extending throughout the length of such sleeve. Flexible connectors 31 and 32 are connected to the bar conductors 23, 24, preferably by riveting the ends of such connectors in slots in the end portion of the bar conductors. These flexible connectors are bent over into diametrically alined radial slots in the end bearing plate 27 and the end of the shaft extension. The outer portion of the flexible connector 31 is held in position, by a wedge 34, within an axial slot in the outer surface of the shaft extension; and the end of this flexible connector is bent out and suitably connected, through a contact ring or segment 35, to the collector ring 10. The outer portion of the flexible connector 32 is held in position by a wedge 36, within an axial slot in the outer surface of the shaft extension, and the end of this flexible connector is bent out and connected, through a contact ring or segment 37, to the collector ring 12. The wedges 34 and 36 pass beneath the collector ring sleeve 13 which serves to hold such wedges in position.

The shaft extension 9, immediately adjacent the body of the core 5, is provided with diametrically alined radial apertures 41 extending into the bore of the shaft extension, and each of these apertures has a radially inner counterbore 42 and a radially outer counterbore 43, the latter being threaded throughout substantially its full depth.

The inner end of each of the conductor bars 23, 24 is provided with a conical threaded aperture 45, preferably by welding an insert washer, having a central conical threaded bore, in position in a correspondingly shaped aperture in the inner end portion of the conductor. Insulating channel or segmental shaped pieces 47, fitted in a correspondingly shaped counterbore at the inner end of the inner conical sleeve 25, are apertured in line with the apertures 45 and are provided with conical seats 48 at the radially outer side. An insulating cap piece 49, preferably in two sections, within the ends of the insulating pieces 47, insures desired electrical separation of the inner end of the conductor bars 23, 24 from inner end wall of the counterbore in the shaft extension. The inner end of the inner conical sleeve 25 is slotted, as indicated at 51; and the outer conical sleeve 26 is likewise slotted or bored, as indicated at 52. When the conductor bars 23, 24 and their clamping and supporting sleeves 25, 26 are in normal position, the inner end of the inner sleeve 25 abuts against the end wall of the bore of the shaft.

A connecting stud 56 is axially disposed in each of the radial apertures 41 in the shaft extension, and a counterbored sleeve 57 of insulating material closely surrounds the lower portion of the stud and passes through the inner end of the aperture 41, the aperture 52 in the sleeve 26, and the slot 51 in the sleeve 25, the lower end of this insulating sleeve 57 being tapered to match the conical seat 48 in the adjacent insulating piece 47. Between an external shoulder at the inner end of the counterbored portion of the sleeve 57 and the shoulder at the inner end of the counterbored portion 42 of the aperture 41, a gas-tight gasket or washer 58, of lead or like material, is held in position. The counterbored outer portion of the insulating sleeve 57 has a comparatively close fit with the wall of the counterbore 42 and the inner portion of this sleeve fits closely in the lower end of the aperture 41. Resting on an internal shoulder at the lower end of the counterbored portion of the sleeve 57 is a gasket 60, of lead or other suitable material which will, under pressure exerted by an outer insulating sleeve 61, produce a gas-tight seal around the stud 56 at this point.

After the lower threaded conical end of each stud 56 has been securely threaded into the conical threaded aperture in the conductor bar 23 or 24, the insulating sleeve 61 is forced inwardly by a bearing ring 62, threaded in the counterbored portion 43, this ring acting against the shoulder 63 on the sleeve 61, preferably through the intermediary of a bearing washer, and forcing this sleeve inwardly to compress the gasket 60 and establish a gas-tight seal about the stud. The pressure exerted by the sleeve 61, through the gasket 60, forces the counterbored sleeve 57 inwardly to cause the packing or gasket 58 to establish a gas-tight seal with the wall of the counterbore 42, to prevent leakage between this sleeve and such wall.

The outer end of the stud 56 is maintained and secured in position within the counterbore 43 of the aperture 41, and insulated from the core and shaft, through providing an insulating sleeve 65 surrounding the stud above and resting on an enlargement 67 on the stud. A screw ring 68 is threaded in the upper part of the counterbore 43 and spaced from the insulating sleeve 65 by an insulating thimble 70; and this ring 68 is operative, through an intermediate non-shrinking pressure washer 71, of insulating material, to exert pressure on the enlargement 67 and thus hold the upper end of the stud in position and insulated from the core and shaft.

A terminal 72, leading from one of the end turns 7 of the winding, is connected to the upper end of the stud 56 by a screw 73 threaded into an aperture in the stud, an insulating bearing washer or ring 74 and a relatively stiff metal bearing washer being interposed between the upper end of the stud and the terminal 72 and serving to space and insulate the terminal and the upper end of the stud from the surrounding metal parts of the shaft extension.

In assembling the lead connections, the two insulated conductor bars 23, 24 are disposed within the inner split sleeve 25, with the insulating spacer 29 between the conductor bars, and the outer split sleeve is placed about the inner split sleeve. With the sleeves held together temporarily about the conductor bars, and the insulating pieces 47 and the end cap 49 in position about the conductor bars and within the counterbore at the inner end of the inner sleeve 25, the assembly is inserted within the bore of the shaft extension, the outer sleeve 26 being withdrawn at the time outwardly beyond the inner sleeve to a sufficient extent to permit the outer sleeve to slide readily into the bore of the shaft. Because of the splined connection between the split sleeves 25 and 26 and between the latter sleeve and the wall of the shaft bore, the assembly will move inward in correct position to permit alinement of the conical openings 45 in the conductor bars with the apertures 41 in the rotor or shaft thereof. The flexible connectors 31, 32 are connected to the outer ends of the conductor bars before the latter are placed within the inner sleeve 25, or at least before they are inserted the full distance into the sleeve.

When the assembly is inserted to a point where the apertures 45 in the conductor bars are in proper alinement with the aperture 41 in the shaft extension, at which time the inner end of the sleeve 25 bears against the inner end wall of the shaft bore, the insulating sleeve 57 is positioned in the aperture 41 and the counterbore 42 thereof, with the lower reduced end of this sleeve projecting through the aperture 41 and the openings in the alined sleeves 25, 26 and into the insulating pieces 47, and with the gas sealing gaskets or packings 58 and 60 in position, and the insulating sleeve 61 inserted in position within the counterbore of the sleeve 57. The threaded gland or holding ring 62 is threaded to a position wherein it bears lightly on a shoulder 63 of the insulating sleeve 61. The stud 56 is then inserted into position, and the lower conical end thereof is threaded in position in the aperture 45 of the conductor bar.

The outer split conical sleeve 26 is preferably then firmly secured in position within the shaft bore. This is done by forcing this outer sleeve axially inward, through the action of the plate 27 bearing on the outer end of this sleeve and the clamping plate 28 being drawn up, by its securing bolts threaded into the shaft extension, the flexible connectors 31, 32 and the wedges 34, 36 being inserted in position before the clamping plate 28 is applied. Forcing the outer sleeve into operative position serves to contract the split sleeves 25 and 26 and clamp all of the parts of the lead connection assembly securely in position within the shaft bore, with the inner end of the inner sleeve 25 abutting the inner end of the bore.

The gland ring 62 is then threaded to final position, by a tool entering recesses in the upper face of the ring, and, through its forcing action on the shoulder 63 of the insulating sleeve 61, the ring 62 forces this sleeve inwardly against the gasket 60, and this forces the enlarged upper end of the insulating sleeve 57 against the gasket 58, to secure these sleeves in position with gas-tight seals along the stud 56 and along the wall of the counterbore 42 of the aperture 41, thus preventing any leakage of gas through the aperture 41 to the bore of the shaft.

The insulating sleeve 65, the bearing washer 71 and the insulating thimble 70 are then applied to the upper end of the stud; and the threaded gland ring 68 is threaded inwardly against the bearing washer 71 to securely hold the outer end of the stud in position. The terminal 72 of the field winding is then applied to the outer end of the stud 56 by means of the securing screw 73, with the insulating washer 74 and the bearing washer 75 interposed between the threaded gland ring 68 and the terminal 72.

The supporting cover or shield 18 may then be applied and secured in position through the collar 19 of the threaded ring 20.

Through the arrangement of the lead connection described, the bar conductors and the mounting and securing parts therefor are held securely in symmetrical and balanced relation close to and about the rotor axis, thus minimizing centrifugal stresses on the parts and effectively holding the parts in position against any such stresses; and the connections from the rotor winding to the axially positioned conductor bars within the shaft bore are such as to provide an excellent electrical connection which is fully insulated from the rotor core; and further, the arrangement is such as to thoroughly seal against leakage of gas from the space within the enclosing housing of the machine, through the apertures in which the studs are disposed, to the bore of the shaft extension and thence to the surrounding atmosphere.

It should be understood that the invention is not limited to the specific details of design and construction shown and described herein, for obvious modifications, within the scope of the appended claims, will be apparent to persons skilled in the art.

It is claimed and desired to secure by Letters Patent:

1. In combination in a dynamo-electric machine, a rotor having a winding thereon and a shaft provided with an axial bore, a lead connection from said winding and comprising a conducting element extending through a radial aperture in the bored portion of said shaft and spaced and insulated from the wall of said aperture, and a conducting element disposed longitudinally within the bore of said shaft and insulated therefrom, and means for securing said second conducting element in fixed position within the bore of said shaft, said securing means comprising a multiple section clamping element surrounding said second conducting element, and means associated with the wall of the bore in said shaft for rigidly securing said clamping element and said second conducting element in position.

2. In combination in a dynamo-electric machine, a rotor having a winding thereon and a shaft provided with an axial bore, a plurality of lead connections from said winding and each comprising a rigid conducting element extending through an individual radial aperture in the bored portion of said shaft and spaced and insulated from the wall of said aperture, and a conducting element disposed longitudinally within the bore of said shaft and detachably connected to said first conducting element, the several radial apertures in said shaft being uniformly spaced about the axis of said shaft, and said second conducting elements being insulated from said shaft and from each other, and means for securing said second conducting elements as a group in fixed centrally located position within the bore of said shaft, said means comprising a split clamping sleeve within the bore of said shaft and extending over the major portion of the length of said second conducting elements and having a tapered exterior, and means cooperative with the wall of the bore of the shaft and said tapered sleeve for holding said second conducting elements rigidly clamped in said sleeve and holding the latter rigidly in position.

3. In combination in a dynamo-electric machine, a rotor having a winding thereon and a shaft provided with an axial bore, a lead connection from said winding and comprising a rigid conducting element connected to said winding and extending through a radial aperture in the bored portion of said shaft in spaced and insulated relation with respect to the wall of said aperture and being threaded at its inner end, and a conducting element disposed longitudinally within the bore of said shaft and insulated therefrom and connected in threaded relation to the inner end of said first conducting element, and means for securing said second conducting element in fixed position within the bore of said shaft, said means comprising a split clamping sleeve having a tapered exterior within the bore of said shaft, and means cooperative with the wall of the bore of the shaft and said clamping sleeve for rigidly clamping said sleeve about said second conducting element and holding said sleeve and said second conducting element rigidly in position.

4. In combination in a dynamo-electric machine, a rotor having a winding thereon and a shaft provided with an axial bore, a plurality of lead connections from said winding, each of said lead connections comprising a rigid conducting element connected to said winding and extending through an individual aperture passing through the bored portion of said shaft transversely of the axis thereof and spaced and insulated from the wall of said aperture, and a conducting element disposed longitudinally within the bore of said shaft and connected at its inner end to said first conducting element, the several transverse apertures in said shaft being symmetrically spaced about the axis of said shaft, and said second conducting elements being insulated from said shaft and from each other, and means for securing said second conducting elements in centrally located fixed position within the bore of said shaft and symmetrically disposed about the axis thereof, said means comprising a two-part split clamping sleeve embracing said conductors throughout the major portion of the length thereof within said bore, said clamping sleeve having a tapered outer surface, and clamping means within the bore of said shaft and having the tapered inner surface cooperative with the tapered surface of said sleeve and with the wall of the bore of the shaft and operative on being forced axially within said bore to hold said clamping sleeve rigidly clamped about said second conducting elements and to secure the latter and said split clamping sleeve in fixed position within the bore of the shaft.

5. In combination in a dynamo-electric machine, a rotor having a winding thereon and a shaft provided with an axial bore, a lead connection from said winding, said lead connection comprising a rigid conducting element connected to said winding and extending through a radial aperture in the bored portion of said shaft and rigidly held spaced and insulated from the wall of said aperture, and a conducting element disposed longitudinally within the bore of said shaft and insulated therefrom, said first conducting element being connected to said second conducting element, and means for securing said second conducting element in fixed position within said bore, said means comprising a pair of telescoping split clamping sleeves, the inner sleeve embracing said conducting element throughout the major portion of the length thereof within said bore and having a conical outer surface, and the outer sleeve having a conical inner surface and tapered in an opposite direction from the outer surface of the inner sleeve, and means for forcing and holding said outer sleeve within the bore of said shaft to thereby securely clamp said inner sleeve and the conductor therewithin in rigidly braced relation with respect to said shaft.

6. In combination in a dynamo-electric machine, a rotor having a winding thereon and a shaft, said shaft being provided with an axial bore and an aperture through the shaft from the outer periphery of the bored portion thereof to the interior of said bore, a conducting element in the form of a rigid stud positioned in said aperture and connected to a terminal of said winding, an insulating spacer surrounding said stud within said aperture, and means cooperative with said stud and said insulating spacer for maintaining said stud in mechanically secure and electrically insulated relation with respect to the wall of the aperture of said shaft and with a gas tight seal between said insulating spacer and said stud and the wall of said aperture.

7. In combination in a dynamo-electric machine, a rotor having a winding thereon and a shaft provided with an axial bore and having a radial aperture through the bored portion of the shaft from the outer periphery thereof to said bore, a conducting element in the form of a rigid stud positioned in said radial aperture and connected to a terminal on the end portion of said winding, an insulating sleeve about said stud within said aperture, gas impervious gaskets between said stud and said sleeve and between said sleeve and the wall of said radial aperture, and means for securing said stud in mechanically secure and electrically insulated relation within said radial aperture, and means for exerting pressure on said gaskets to establish and maintain said gas-tight relation between said stud and said sleeve and between said sleeve and the wall of said aperture.

8. In combination in a dynamo-electric machine, a rotor having a winding thereon and a shaft provided with an axial bore extending to a point radially within the extending end portion of said winding, said shaft having a substantially radial aperture through the shaft from the outer periphery thereof to said bore, the radially outer portion of said radial aperture being provided with a counterbore, a conducting element in the form of a rigid stud positioned in said radial aperture and connected to a terminal on the end portion of said winding, a counterbored insulating sleeve surrounding said stud in said aperture, gas impervious gaskets between said stud and said sleeve and between said sleeve and the wall of said radial aperture, and means for securing the radially outer portion of said stud in mechanically secure and electrically insulated relation within said radial aperture, and means for exerting pressure on said gaskets to maintain a gas-tight relation between said stud and said sleeve and between said sleeve and the wall of said aperture, said latter means including a second insulating sleeve disposed within the counterbored portion of said first sleeve, and means cooperative with a threaded portion of the wall of the counterbore of said radial aperture for forcing said second sleeve into and maintaining the same in operative position.

9. In combination in a dynamo-electric machine, a rotor having a winding thereon and a shaft provided with an axial bore and having a substantially radial aperture through the shaft from the outer periphery thereof to said bore, a conducting element in the form of a rigid stud positioned in said radial aperture and connected to a terminal of said winding, an insulating spacer surrounding said stud within said radial aperture, and means cooperative with said stud and said insulating spacer for maintaining said stud in mechanically secure and electrically insulated and gas-tight relation with respect to the wall of the aperture of said shaft, said conducting element being threaded at its inner end, and a bar-shaped conductive element secured in operative relation within the bore of the shaft and provided at its inner end with a threaded aperture, the radially inner end of said stud being threaded into the aperture at the inner end of said conductive element in said bore.

10. In combination in a dynamo-electric machine, a rotor having a winding thereon and a shaft provided with an axial bore, said shaft being provided with a plurality of substantially radial apertures uniformly angularly spaced about the shaft and passing therethrough and entering said bore, lead terminals from an extending end portion of said rotor winding, studs connected to said lead terminals and passing through said radial apertures and positioned therein in mechanically secure and electrically insulated relation with respect to the walls of said radial apertures, a plurality of conductive bars equal in number to the number of said studs and disposed longitudinally within the bore of said shaft, a split clamping element receiving and surrounding said conductive bars throughout substantially their full length within said bore, means cooperative with said split sleeve and the wall of said bore for securing said conductive bars within said split sleeve and for securing the latter in definite operative position in said bore wherein the radially inner end of said studs may be connected to the axially inner ends of said conductive bars, and a clamping element secured in position adjacent the axially outer end of the bored portion of said shaft for forcing said securing means to and holding it in desired operative position.

11. In combination in a dynamo-electric machine, a rotor having a winding thereon and a shaft provided with an axial bore, said shaft being provided with diametrically alined radial apertures therethrough entering said bore, a conductive stud centrally located in each of said apertures, lead terminals from extending end portions of said rotor winding to said studs, said studs being secured in said apertures in mechanically secure and electrically insulated and gas-tight relation with respect to the walls of said radial apertures, a pair of conductor bars within the bore of said shaft with their inner ends connected to said studs, a split clamping sleeve surrounding said conductor bars throughout the major part of their length within said bore and having a tapered outer surface, a second split clamping sleeve surrounding and longitudinally movable relative to said first clamping sleeve and having its inner surface tapered in an opposite sense to the outer surface of said inner clamping sleeve, said outer clamping sleeve having a splined connection with said inner clamping sleeve and with the wall of the bore in the shaft, and means cooperative with the axially outer end of said outer clamping sleeve for adjusting the latter longitudinally with respect to the other sleeve to contract said clamping sleeves about said conductor bars and mechanically secure the assembly of telescoping sleeves and conductor bars disposed therein in mechanically secure position within the bore of the shaft and with their inner portions connected to said studs.

12. In combination in a dynamo-electric machine, a rotor having a winding thereon and a shaft provided with an axial bore, a lead connection from said winding and comprising a conductive portion connected to said winding and extending through an aperture in the bored portion of said shaft and into the bore thereof, said conductive portion being spaced and insulated from the wall of said aperture, and a second conductive portion disposed longitudinally within the bore of said shaft and connected to said first conductive portion, and means for securing said second conductive portion in fixed position within said bore, said securing means comprising a multiple section clamping sleeve surrounding said second conductive portion throughout the major portion of its length and engaging an abutment on said shaft within the bore thereof to limit the axially inward movement of said sleeve, and a second clamping device within said bore and surrounding said clamping sleeve and cooperatively associated with the wall of said bore and said sleeve and operative to rigidly secure said first clamping sleeve and second conductive portion in operative position and against relative rotation.

13. In combination in a dynamo-electric machine, a rotor having a winding thereon and a shaft provided with an axial bore, a plurality of lead connections from said winding, each of said lead connections including a conducting element extending through an individual radial aperture in the bored portion of said shaft and being spaced and insulated from the wall of said aperture, and a second conducting element disposed longitudinally within the bore of said shaft and connected at its inner end to said first conducting element, said several radial apertures being symmetrically spaced about the axis of said shaft, said second conducting elements being insulated from said shaft and from each other, and means for securing said second conducting elements in centrally located fixed position within the bore of said shaft and symmetrically disposed about the axis thereof, said means comprising a sectional clamping sleeve embracing said second conducting elements throughout the major portion of the length thereof, said clamping sleeve having a tapered outer surface, and clamping means within the bore of said shaft and held against rotation relative to said shaft, said clamping means having a tapered inner surface cooperative with the tapered outer surface of said sleeve and operative on being forced axially within said bore to hold said clamping sleeve rigidly clamped about said second conducting elements and to secure the latter and said sectional clamping sleeve in fixed position within the bore of the shaft.

SOREN H. MORTENSEN.